June 19, 1934.  E. H. LAND  1,963,496
LIGHT VALVE
Filed Jan. 16, 1933   2 Sheets-Sheet 1

INVENTOR
Edwin H. Land
BY
Warfield & Brown
ATTORNEY

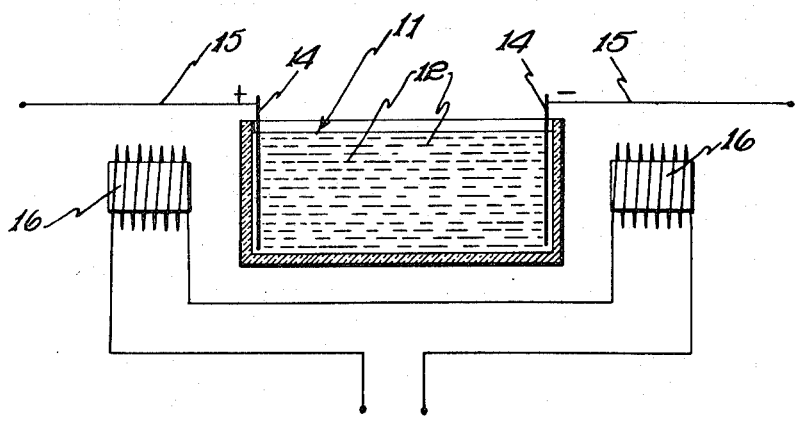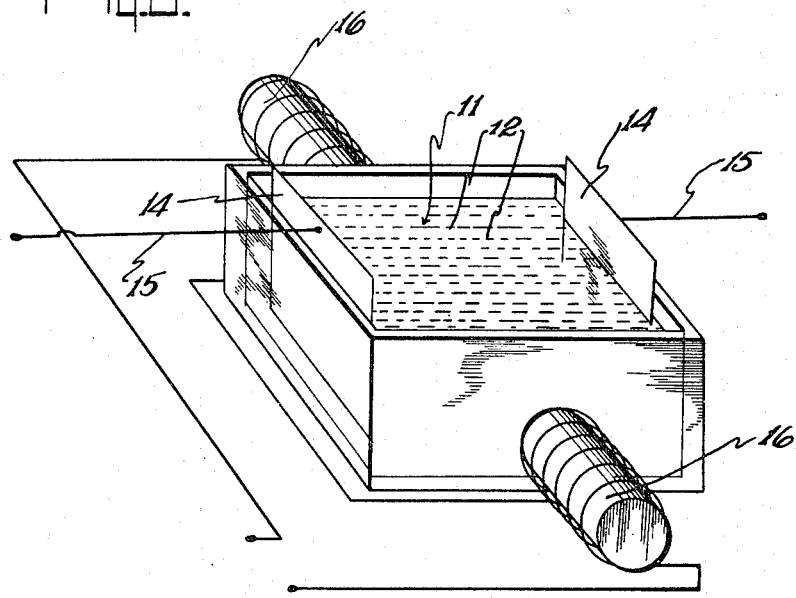

Patented June 19, 1934

1,963,496

UNITED STATES PATENT OFFICE 1,963,496

LIGHT VALVE

Edwin H. Land, Wellesley Farms, Mass.

Application January 16, 1933, Serial No. 651,954

17 Claims. (Cl. 88—61)

This invention relates to a method for controlling radiation and apparatus therefor, and, more specifically, to a method for controlling the passage of radiation through a material medium by the application of an electrically controlled field of force to said medium.

In general, it is an object of the invention to provide a method which will efficiently perform the purpose toward which it is directed, and a device which is simple and economical of construction and which can be expeditiously and conveniently manipulated and readily manufactured and assembled.

Another object of the invention is to provide a device of the character described, the transmissivity of which in a given direction is a function of the electrically controlled field of force applied in that direction and which has means for setting up such a field which do not substantially impair electromagnetic propagation.

Another object is to provide a device which, when subjected to an electrically controlled field of force, will become more or less pervious to radiation.

Another object is to provide a device for controlling the intensity of a transmitted beam of light by interposing in the path of the beam suspended particles, and by providing means for controlling the effective total surface area of said particles interposed across said beam.

A further object is to provide a device adapted to control the intensity of a transmitted beam of light by interposing in the path of the beam light-absorbent particles in suspension, and by providing means to control the effective surface area of said particles interposed across said beam.

Another object is to provide a device adapted to control the intensity of a transmitted beam of light by interposing in the path of the beam reflecting particles in suspension, and by providing means to control the effective surface area of said particles interposed across said beam.

A further object of the invention is to provide a method of controlling the intensity of a light beam by interposing in the path of the beam a suspension of light-blocking and/or light-scattering properties and by providing means for controlling the total effective surface of said particles interposed in the path of the beam.

This application is a continuation in part of my co-pending application, Serial No. 628,431, filed August 11, 1932.

Other objects of the invention will in part be obvious and will in part appear hereinafter.

The invention accordingly comprises the several steps and the relation and order of one or more of such steps with respect to the others, and the apparatus embodying the features of construction, combinations of elements and arrangement of parts which are adapted to effect such steps, all as exemplified in the following detailed disclosure and the scope of the application of which will be indicated in the claims.

For a fuller understanding of the nature and objects of the invention, reference should be had to the following detailed description taken in connection with the accompanying drawings, in which:

Fig. 7 is a view similar to Fig. 1, illustrating the use of an electric field in connection with a biasing magnetic field where the two fields parallel each other; and Fig. 8 is a view similar to Fig. 7, where the two fields are at an angle, but in perspective.

Figs. 3 and 5 are illustrative of devices embodying the invention where no field of force is applied, and where the suspended particles are heterogeneously dispersed throughout the suspending medium.

Figure 3:
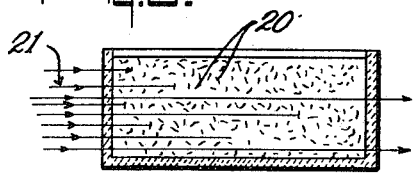
Fig. 3 is an enlarged illustrative view of a portion of a device embodying one form of the invention, illustrating the action of light-absorbent particles such as are within the scope of the invention during the period of the operation of the device when no field is impressed thereon.
Figure 4:
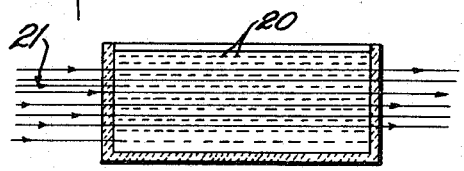
Fig. 4 is a similar view showing the action of the particles when a field is impressed thereon.
Figure 5:
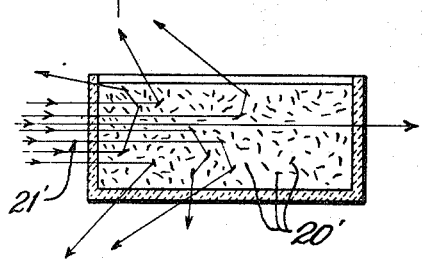
Fig. 5 is a view similar to Fig. 3, save that light-reflecting particles have been substituted for the light-absorbent particles illustrated in Fig. 3.
Figure 6:
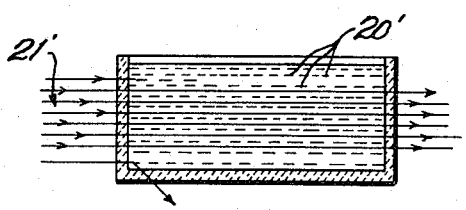
Fig. 6 is a view similar to Fig. 4 illustrating, however, the action of the light-reflecting particles shown in Fig. 5.

Figs. 4 and 6 are illustrative of these devices, where the fields of force applied are sufficient to cause complete alignment of the particles within the suspension. It will be obvious that where the fields of force applied are not sufficient to cause complete orientation, conditions will arise within the apparatus intermediate between those shown in Figs. 3 and 5 and those shown in Figs. 4 and 6.

Figure 1:
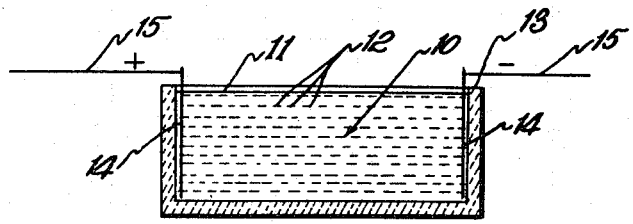
Fig. 1 is a cross-section of a device embodying one form of the invention.
Figure 2:
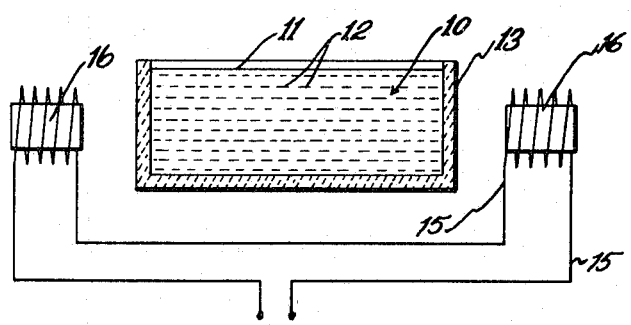
Fig. 2 is a cross-section of a modification of the structure shown in Fig. 1, in which means for impressing a magnetic field upon the suspended particles are shown.

In the drawings, and with particular reference to Figs. 1 and 2, 10 indicates a fluid suspension comprising a suspending medium 11 which may be either liquid or gaseous, and a mass of suspended particles 12. A suitable container 13 is provided. Associated with the suspension are means to apply a field of force to the suspended particles. In the form of the invention shown in Fig. 1, this is accomplished by means of the electrodes 14 positioned at either side of the suspension, so that when the circuit comprising the electrodes and the lead-in wires 15 is energized, the suspended particles are subjected to an electrical field. The electrodes may be of any suitable type. If a device is to be interposed in the path of a beam of light passing through the device at right angles to the field of force set up between the electrodes, they may consist of solid sheets, for example, sheets of copper. If the device is to be set in the path of a beam of light so that the beam passes through the device parallel to the field of force set up when the circuit is energized and through the electrodes 14, those electrodes should preferably comprise sputtered films, as, for example, sputtered films of platinum having a thickness of but a few molecules; or the electrodes should comprise conducting meshes having a multiplicity of interstices therein through which the beam may pass. Fine copper wire mesh may be suitable for this type of electrode.

In Fig. 2 means are shown for impressing upon the suspension a magnetic field. As shown, such means comprise a pair of conjugating magnetic poles such as illustrated at 16. A suitable circuit 15 is, of course, provided. Any means for impressing a suitable electrically controlled field upon the suspension may be employed and are to be deemed to fall within the scope of my invention. If desired, a combination of such fields may also be employed; for example, a magnetic field positioned to act as a biasing or restoring field of force may be employed with an electric field in such a way that the field of force set up by the electric field acts to effect a different orientation of the particles than the field set up by the magnetic field. With such a system, a fluctuation in the intensity of the light transmitted by the valve may be obtained by an alteration in the orientation of the suspended particles due to an inter-action of the two fields of force. Such a combination of fields is shown, for example, in Figs. 7 and 8, where 11 indicates a suspending medium in which a mass of particles 12 is dispersed. In these figures, 14 represents electrodes adapted with the lead-in wires 15 to impress an electric field on the suspension, and 16 represents magnetic poles adapted with a suitable circuit to impress a magnetic field upon the suspension, biasing the electric field. In Fig. 7 the two fields are shown as parallel, and in Fig. 8 the two fields are shown as positioned at an angle to each other.

The suspended particles 12 may be opaque, translucent, transparent, metallic or non-metallic. They must, however, be responsive to the impressed field. In a device utilizing an impressed electric field, where a suitable non-conducting suspending medium is chosen, a wide range of substances in asymmetric particles has been found to be responsive and effective. It will be understood that where particles are referred to herein as asymmetric they will be deemed to include a grouping of non-asymmetric particles acting as an asymmetric unit. Where a magnetic field is employed similar results are obtained, even where the suspending fluid is a conductor, it being essential, however, that the suspending medium shall have a magnetic susceptibility differing from that of the suspended particles. It is, of course, unnecessary that the suspended particles be ferro-magnetic.

In addition to their susceptibility to the impressed field, the suspended particles should preferably be of such shape as to present, when aligned by the impressed field, a total surface area in the path of the beam of light passing through the device, differing from the total surface area in the path of the beam presented by the particles when they are heterogeneously dispersed through the suspending medium. Asymmetric particles possess this property, as do suspensions which assume an asymmetric form in the impressed field, such as particles that agglomerate or particles that change shape as, for example, the suspended liquid spheres in an emulsion.

The suspended particles may be said to fall generally into three classes, particles which are predominantly light-absorbent, particles which are predominantly reflectors, and particles which possess both qualities.

In Figs. 3 and 4 of the drawings is shown a device utilizing light-absorbent particles. Fig. 3 shows a dispersion of these particles 20 in heterogeneous position when no field is impressed upon the device, and Fig. 4 shows the position assumed by the particles when a field is impressed thereon. A beam of light, indicated as at 21, is shown impressed upon the device. Much of the light is blocked by the heterogeneously dispersed particles, in Fig. 3, and absorbed by them. Where the particles have been aligned, as in Fig. 4, a great deal more of the light passes through the device, because the effective light-absorbent surface of the mass of particles interposed in the path of the beam has been reduced by the alignment of the particles. If it be assumed that Figs. 3 and 4 are representative of a portion of the structure shown in Fig. 1, then the beam of light 21 may be deemed as passing through the device and through the electrodes 14 parallel to the field impressed upon the suspension. It will be obvious that, if the beam of light 21 were projected through the device at right angles to the impressed field and as shown at right angles to the plane of the drawings, the orientation of the particles 21, as shown in Fig. 4, would result in an increase in the effective light-absorbing surface of the mass of particles upon orientation, and hence would cause a decrease in the intensity of the light transmitted.

In Figs. 5 and 6 are illustrated portions of the device using light-reflecting particles. From an examination of Fig. 5, it will be apparent that much of the beam of light 21' striking the suspension is reflected back by the particles 20', whereas, in Fig. 6, upon orientation of the particles but little of the beam 21' is reflected back. It will, of course, be obvious that if the beam is passed through the device at right angles to the direction shown in Figs. 5 and 6, orientation of the particles will effect an increase rather than a decrease in the total effective light-reflecting surface of the suspension, and will cause a decrease in the intensity of the beam. Any suitable suspending medium may be employed with the provision that, where an electric field is to be used with the device, the suspending medium should preferably be non-conducting.

The suspension of the particles within the suspending medium should preferably be a true suspension, or, in any event, a slowly settling suspension. This is not, however, essential to my invention, as it is obvious that a device may be used in which a constantly renewed supply of particles may be furnished to the suspension within the impressed field. Furthermore, it will be obvious that where the suspension employed is one which gradually settles, means may be employed with the device to stir up and redistribute the settled particles. Under certain circumstances, it may be possible to so design the device as to cause a slight current or flow of particles within the container, thus assuring a constant suspension.

I have found that an exceedingly wide range of suspensions may be employed. For example, a suspension of asymmetric graphite particles in oil or in ethyl acetate, or in nitrobenzene, has been found admirable and is representative of the type of device utilizing light-absorbent particles. On the other hand, a suspension of particles of mica in nitrobenzene or in ethyl acetate has been found admirable and is representative of the type of device utilizing a light-reflecting but transparent suspension. A suspension of small particles of metallic aluminum in any suitable medium, as, for example, ethyl acetate, is very effective in devices herein described, and is representative of a device utilizing a light-reflecting but opaque and metallic suspension. The suspension of a dyestuff such, for example, as garnet red in a suitable medium, such as ethyl acetate also functions as a light valve and is illustrative of the type utilizing a suspension partially light-reflecting and partially light-absorbent.

It will be obvious from the brief descriptions given of a few highly diverse suspensions that a great number of different suspensions may be employed. It is essential only that they be of a type such that when a field of force is impressed thereon, they present a different effective light-absorbing or light-reflecting surface to a beam of light passing therethrough from that presented in the absence of an impressed field.

It will be obvious that combinations of suspensions may be employed, provided only that they be of such a type that the impression thereon of a field of force will not result in one element of the suspension counteracting and offsetting the effect of the other element. For example, it has been found that some of the suspended particles align when a field is impressed upon the suspension with their long axes parallel to the field, while others align with their long axes at right angles to the field. Aluminum and mica, for example, cannot be effectively employed in combination in suspension, as alignment of the aluminum particles decreases the intensity of a beam passing through the device and across the field, while an alignment of the particles of mica, under the same conditions, causes a brightening and increase in intensity of the beam. On the other hand, many substances which give the same effect under the same conditions may effectively be combined. These combinations may effectively employ two or more light-absorbing substances, two or more light-reflecting substances, or mixtures of light-absorbing and light-reflecting substances.

The operation of the device is as follows: In the absence of an applied field the suspended particles are caused to assume heterogeneous positions in the suspension by the molecular bombardment of the suspending medium. When the particles are heterogeneously dispersed throughout the suspending medium some may lie across the beam of light passing through the device, others may lie parallel to the beam, and others at varying angles to the beam. They thus present an effective total reflecting or absorbent surface, which is less than that presented by the mass of particles oriented to lie with their longitudinal axes across the beam of light, and which is more than that presented by the particles oriented to lie with their longitudinal axes parallel to the beam. As a field of force is impressed on the suspension, the particles orient or tend to orient. Their total effective reflecting or absorbing surface is, therefore, increased or decreased as they tend to orient across or parallel to the beam of light. This alteration in the effective absorbing or blocking surface of the mass of suspended particles causes a corresponding alteration in the intensity of the transmitted beam. As soon as the field is removed the particles are again restored to their heterogeneous position by the molecular bombardment of the suspending medium. It is not essential that the alteration in the intensity of the beam, and hence the alteration in the effective absorbing or reflecting surface of the mass of suspended particles be great. An exceedingly slight fluctuation in intensity may be sufficient in certain cases to make the valve useful. For example, where the valve is used in connection with a photo-electric cell, the unmodulated portion of the transmitted beam is translated by the photo-electric cell into a direct current component which does not pass the audio-frequency amplifier. It will be understood, however, that the device herein described may be capable of completely modulating the intensity of the transmitted beam.

In all of the types of light valves described herein the suspended particles are preferably small, but preferably somewhat larger than the wave-lengths of the light with which the device is designed to operate. Successful light valves have, however, been devised utilizing truly colloidal suspensions such, for example, as dyes.

The use of the present device as a light valve, or in conjunction with other apparatus in connection with television and other modern problems, is contemplated. The light valves described are exceedingly responsive to high frequencies.

Where the electric field is used, as, for example, in connection with a device such as shown in Fig. 1, the device is electrostatic and requires negligible current to function properly.

Throughout the specification and claims, where the expression "an electrically controlled field of force" is employed, it will be understood as meaning either an electrostatic field of force or an electromagnetic field of force.

Since certain changes in carrying out the above method and in the constructions set forth, which embody the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A light valve comprising a liquid, non-conducting, light-transmitting medium, a dispersed mass of finely divided material suspended therein and showing Brownian movement, and means to apply an electric field of force to said material, said suspended material being of such a character that the total effective surface of said material interposed in the path of a transmitted beam of light may be altered by an alteration of the intensity of the impressed field.

2. A light valve comprising a light-transmitting liquid suspending medium, a dispersed mass of finely divided material suspended therein showing Brownian movement, and having magnetic permeability differing from that of the suspending medium, and means to apply a magnetic field of force to said material, said suspended material being of such a character that the total effective surface of said material interposed in the path of a transmitted beam of light may be altered by an alteration of the intensity of the impressed field.

3. A light valve comprising a light-transmitting liquid suspending medium, a dispersed mass of discrete particles suspended therein and showing Brownian movement, and means to apply an electrically controlled field of force to said particles, said particles being of such a character that the total effective surface of said particles interposed in the path of a transmitted beam of light may be altered by an alteration of the intensity of the impressed field.

4. A light valve comprising a light-transmitting suspending medium, a dispersed mass of non-metallic light-reflecting particles suspended therein and showing Brownian movement, and means to apply an electrically controlled field of force to said particles, said particles being of such a character that the total effective surface of said particles interposed in the path of a transmitted beam of light may be altered by an alteration of the intensity of the impressed field.

5. A light valve comprising a light-transmitting, liquid suspending medium, a dispersed mass of metallic light-reflecting particles suspended therein and showing Brownian movement, and means to apply an electrically controlled field of force to said particles, said particles being of such a character that the total effective surface of said particles interposed in the path of a transmitted beam of light may be altered by an alteration of the intensity of the impressed field.

6. A light valve comprising a light-transmitting suspending medium, a dispersed mass of transparent light-reflecting particles suspended therein and showing Brownian movement, and means to apply an electrically controlled field of force to said particles, said particles being of such a character that the total effective surface of said particles interposed in the path of a transmitted beam of light may be altered by an alteration of the intensity of the impressed field.

7. A light valve comprising a light-transmitting suspending medium, a dispersed mass of opaque light-reflecting particles suspended therein and showing Brownian movement, and means to apply an electrically controlled field of force to said particles, said particles being of such a character that the total effective surface of said particles interposed in the path of a transmitted beam of light may be altered by an alteration of the intensity of the impressed field.

8. A light valve comprising a light-transmitting, liquid suspending medium, a dispersed mass of colloidal particles suspended therein and showing Brownian movement, and means to apply an electrically controlled field of force to said particles, said particles being of such a character that the total effective surface of said particles interposed in the path of a transmitted beam of light may be altered by an alteration of the intensity of the impressed field.

9. A light valve comprising a light-transmitting, liquid suspending medium, a dispersed mass of colloidal light-absorbent particles suspended therein and showing Brownian movement, and means to apply an electrically controlled field of force to said particles, said particles being of such a character that the total effective surface of said particles interposed in the path of a transmitted beam of light may be altered by an alteration of the intensity of the impressed field.

10. A light valve comprising a light-transmitting, liquid suspending medium, a dispersed mass of colloidal light-scattering particles suspended therein and showing Brownian movement, and means to apply an electrically controlled field of force to said particles, said particles being of such a character that the total effective surface of said particles interposed in the path of a transmitted beam of light may be altered by an alteration of the intensity of the impressed field.

11. A light valve comprising a liquid, light-transmitting suspending medium, a dispersed mass of particles showing Brownian movement therein, and means to apply an electrically controlled field of force to said particles to cause the longitudinal axes of a majority of said particles to tend to align uniformly.

12. A light valve comprising a light-transmitting, liquid suspending medium, a dispersion of finely divided material suspended therein showing Brownian movement, means to apply an electrically controlled field of force to said material, said material being adapted upon an alteration of the intensity of said field to present a changed total effective surface area to a beam of light passing through said suspension.

13. A light valve comprising a light-transmitting fluid suspending medium, a dispersed mass of finely divided material suspended therein and showing Brownian movement, means to apply to said material an electric field of force and means to apply to said material a magnetic field biasing said electric field, said material being responsive to each of said fields, said fields cooperating to effect an alteration in the effective surface area of the material interposed in the path of a transmitted beam of light.

14. A light valve comprising a light-transmitting, liquid suspending medium, a dispersed mass of relatively minute light-reflecting particles suspended therein and showing Brownian movement, and means to apply an electrically controlled field of force to said particles, said particles being of such a character that the total effective surface of said particles interposed in the path of a transmitted beam of light may be altered by an alteration of the intensity of the impressed field.

15. A light valve comprising a light-transmitting, liquid suspending medium, a dispersed mass of relatively minute light-absorbing particles suspended therein and showing Brownian movement, and means to apply an electrically controlled field of force to said particles, said particles being of such a character that the total effective surface of said particles interposed in the path of a transmitted beam of light may be altered by an alteration of the intensity of the impressed field.

16. A light valve comprising a light-transmitting liquid suspending medium, a dispersed mass of relatively minute non-metallic particles suspended therein and showing Brownian movement, and means to apply an electrically controlled field of force to said particles, said particles being of such a character that the total effective surface of said particles interposed in the path of a transmitted beam of light may be altered by an alteration of the intensity of the impressed field.

17. A light valve comprising a plurality of electrodes, a light-transmitting, fluid suspending medium positioned between said electrodes, a dispersion of relatively minute particles suspended in said medium and between said electrodes and showing Brownian movement, and means to apply an electric field of force to said particles whereby the longitudinal axes of a majority of said particles are caused to tend to align uniformly.

EDWIN H. LAND.